(12) United States Patent
Abraham et al.

(10) Patent No.: US 8,977,282 B2
(45) Date of Patent: Mar. 10, 2015

(54) MULTI-CHANNEL MANAGEMENT AND LOAD BALANCING

(75) Inventors: Santosh Paul Abraham, San Diego, CA (US); Simone Merlin, San Diego, CA (US); Maarten Menzo Wentink, Naarden (NL); Hemanth Sampath, San Diego, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 12/727,467

(22) Filed: Mar. 19, 2010

(65) Prior Publication Data

US 2010/0248630 A1    Sep. 30, 2010

Related U.S. Application Data

(60) Provisional application No. 61/162,958, filed on Mar. 24, 2009.

(51) Int. Cl.
| | |
|---|---|
| *H04W 72/00* | (2009.01) |
| *H04W 72/02* | (2009.01) |
| *H04W 24/02* | (2009.01) |
| *H04W 72/04* | (2009.01) |
| *H04W 84/12* | (2009.01) |

(52) U.S. Cl.
CPC ............. *H04W 72/02* (2013.01); *H04W 24/02* (2013.01); *H04W 72/0453* (2013.01); *H04W 72/0486* (2013.01); *H04W 84/12* (2013.01)
USPC .......................................... 455/453; 455/450

(58) Field of Classification Search
CPC ..... H04W 72/02; H04W 72/04; H04W 92/02; H04W 72/0453; H04W 72/0486; H04W 84/12
USPC .................................................. 455/453, 450
See application file for complete search history.

(56) References Cited

U.S. PATENT DOCUMENTS

| | | |
|---|---|---|
| 7,158,759 B2 | 1/2007 | Hansen et al. |
| 2002/0110105 A1* | 8/2002 | Awater et al. ................. 370/338 |
| 2003/0040319 A1 | 2/2003 | Hansen et al. |
| 2003/0087645 A1* | 5/2003 | Kim et al. ..................... 455/453 |
| 2004/0189443 A1 | 9/2004 | Eastburn |
| 2004/0264394 A1 | 12/2004 | Ginzburg et al. |
| 2005/0026619 A1 | 2/2005 | Jha |
| 2005/0265298 A1 | 12/2005 | Adachi et al. |
| 2005/0272428 A1 | 12/2005 | Tanabe et al. |
| 2006/0025150 A1* | 2/2006 | Kim et al. ..................... 455/453 |
| 2006/0166677 A1* | 7/2006 | Derakshan et al. ........... 455/453 |

(Continued)

FOREIGN PATENT DOCUMENTS

| | | |
|---|---|---|
| CN | 1640174 A | 7/2005 |
| CN | 1813448 A | 8/2006 |

(Continued)

OTHER PUBLICATIONS

Internation Search Report from PCT US/2010/28532, Sep. 2010.*

(Continued)

*Primary Examiner* — Lewis West
(74) *Attorney, Agent, or Firm* — Steven R. Thiel

(57) ABSTRACT

Certain aspects of the present disclosure provide a protocol to allow for load balancing between multiple frequency channels in a wireless communications system.

19 Claims, 17 Drawing Sheets

(56) References Cited

U.S. PATENT DOCUMENTS

| | | | |
|---|---|---|---|
| 2007/0097912 | A1 | 5/2007 | Kawaguchi et al. |
| 2007/0109980 | A1 | 5/2007 | Awater et al. |
| 2007/0298810 | A1 | 12/2007 | Kasher et al. |
| 2008/0107156 | A1 | 5/2008 | Wentick et al. |
| 2008/0117864 | A1 | 5/2008 | Wu et al. |
| 2008/0220786 | A1 | 9/2008 | Beacham |
| 2009/0274140 | A1 | 11/2009 | Cordeiro et al. |
| 2010/0246399 | A1 | 9/2010 | Abraham et al. |

FOREIGN PATENT DOCUMENTS

| | | |
|---|---|---|
| JP | 2006013559 A | 1/2006 |
| WO | WO-2005006662 A1 | 1/2005 |
| WO | WO2008008920 | 1/2008 |
| WO | 2009031966 A2 | 3/2009 |

OTHER PUBLICATIONS

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications;IEEE Std 802.11-2007 (Revision of IEEE Std 802.1 IEEE Standard; [IEEE Standard], IEEE, Piscataway, NJ, USA, Jun. 12, 2007 , pp. C1-1184, XP017604022 ISBN: 978-0-7381-5656-9.

International Search Report & Written Opinion—PCT/US2010/028523, International Search Authority—European Patent Office—May 27, 2010.

International Search Report and Written Opinion—PCT/US2010/028532, International Search Authority—European Patent Office—Aug. 6, 2010.

Priyank Porwal and Maria Papadopouli: "On-demand channel switching for multi-channel wireless MAC protocols" Proceedings of the 12th European Wireless Conference, Athens, Greece, Apr. 2-5, 2006,, [Online] Apr. 2, 2006, p. 12PP, XP007905659 Retrieved from the Internet: URL:http://www.1cs.forth.gr/netgroup/mobi1 e/publications/eu06.pdf> abstract Sections I and E.

Taiwan Search Report—TW099108832'TIPO—Apr. 26, 2013.

IEEE Standard for Information Technology—Telecommunications and Information Exchange Between Systems—Local and Metropolitan Area Networks-Specific Requirements—Part 11: Wireless LAN Medium Access Control (MAC) and Physical Layer (PHY) Specifications; IEEE Std 802.11-2008 (Revision of IEEE Std 802.11, IEEE Standard; [IEEE Standard], IEEE, Piscataway, NJ, USA, Jul. 15, 2008, pp. 1-126.

\* cited by examiner

AP perspective

STA guess on the AP perspective

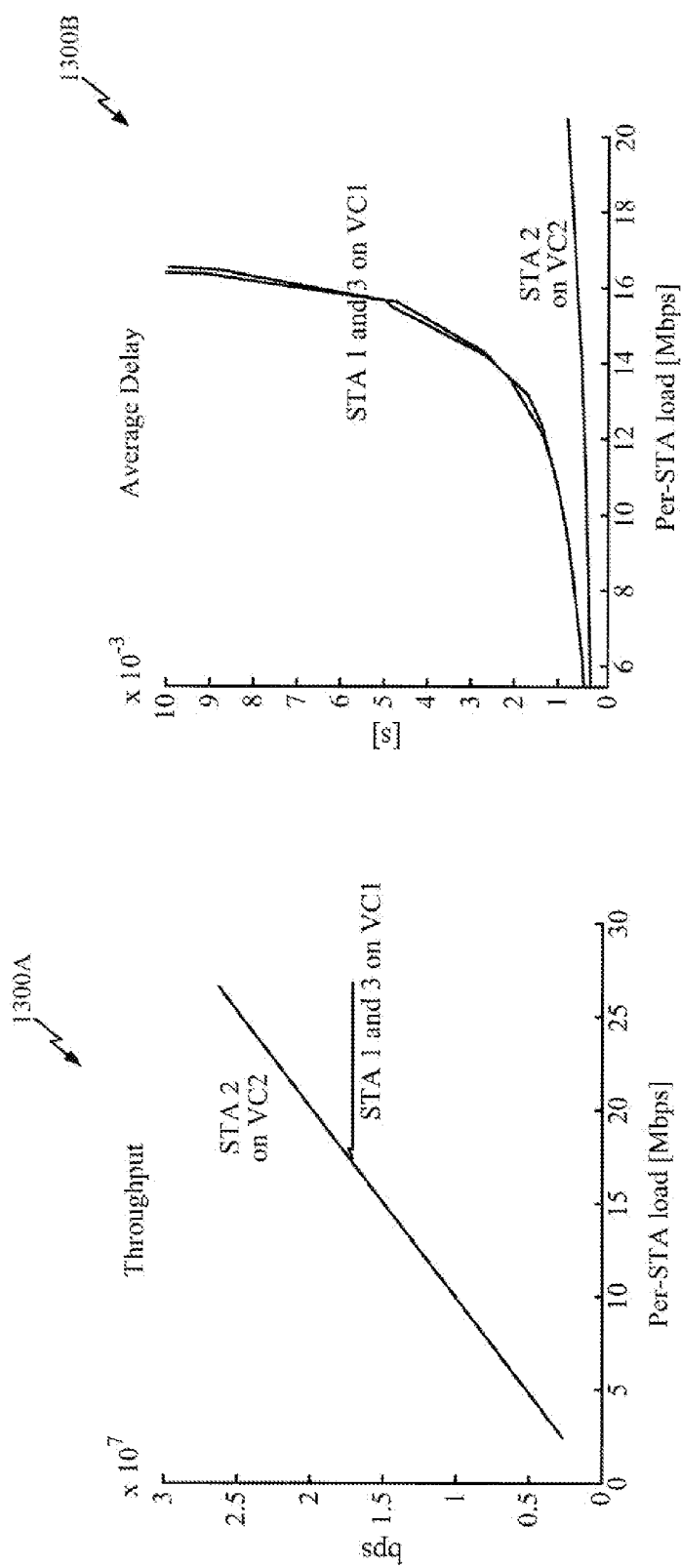

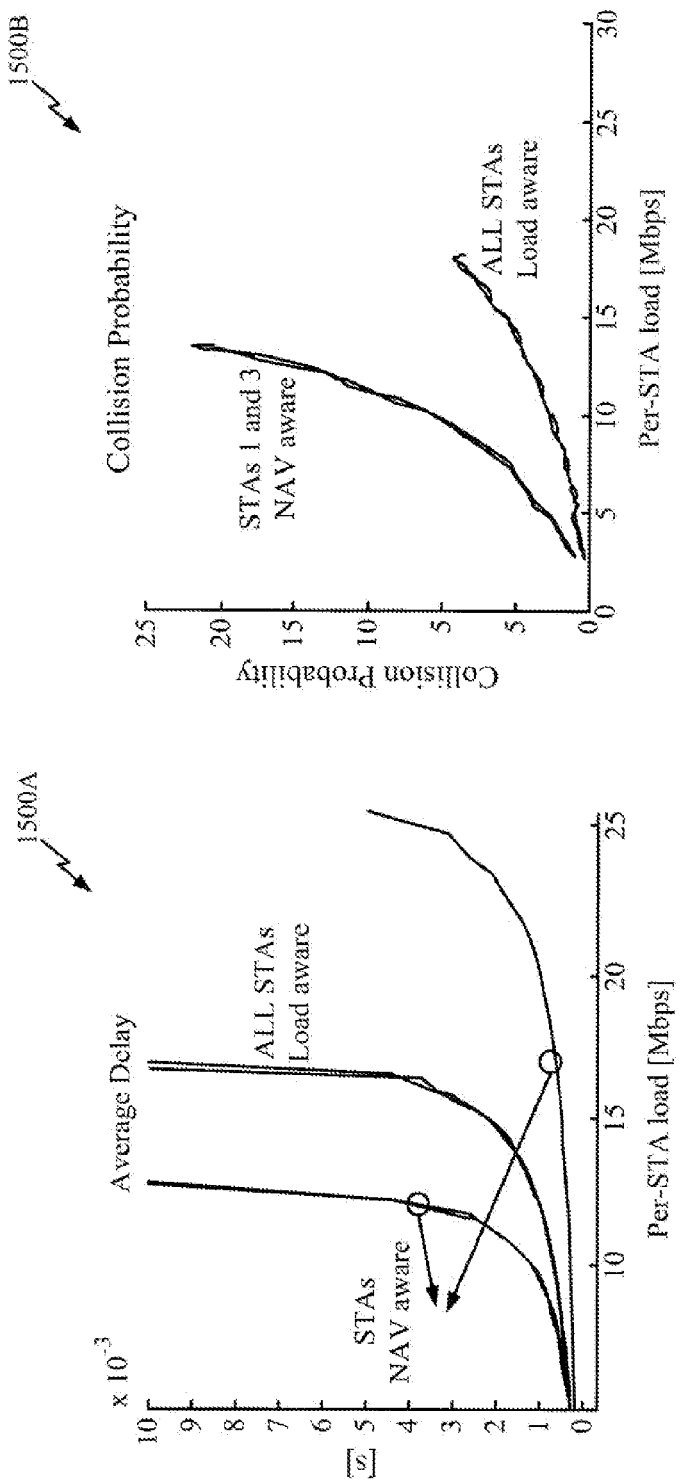

MULTI-CHANNEL MANAGEMENT AND LOAD BALANCING

CLAIM OF PRIORITY UNDER 35 U.S.C. §119

The present application for patent claims benefit of U.S. Provisional Patent Application No. 61/162,958, entitled, "MULTI-CHANNEL MANAGEMENT AND LOAD BALANCING," filed Mar. 24, 2009 assigned to the assignee hereof and hereby expressly incorporated by reference herein.

TECHNICAL FIELD

The present disclosure generally relates to wireless communications and, more specifically, to multi-channel wireless communications.

BACKGROUND

In order to address the issue of increasing bandwidth requirements demanded for wireless communication systems, different schemes are being developed to allow multiple user terminals to communicate with a single base station utilizing the same shared single channel or multiple channels.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S$ min $\{N_T, N_R\}$. The $N_S$ spatial streams may be used to transmit $N_S$ independent data streams to achieve greater overall throughput.

In wireless networks with a single Access Point (AP) and multiple stations (STAs), concurrent transmissions may occur on multiple channels toward different stations, both in the uplink and downlink direction. However, each STA may be capable of transmitting or receiving in only one channel at a time, while the AP is typically capable of transmitting or receiving concurrently on multiple channels. One challenge in such systems is to allocate STAs to operate (transmit and/or receive) on different channels in a manner that achieves acceptable performance, in terms of load balancing and/or some other consideration, such as Quality of Service (QoS) targets.

SUMMARY

Certain aspects provide a method of wireless communications. The method generally includes communicating with a plurality of wireless apparatuses concurrently via a plurality of frequency channels and transmitting a request for at least one of the wireless apparatuses to switch from communicating via a first one of the frequency channels to communicating via a second one of the frequency channels.

Certain aspects provide a method of wireless communications. The method generally includes communicating with an access point via a first of a plurality of frequency channels, receiving a request, from the access point, to switch from the first to a second of the plurality of frequency channels, and communicating with the access point via the second frequency channel.

Certain aspects provide a method of wireless communications. The method generally includes communicating with a plurality of wireless apparatuses concurrently via a plurality of frequency channels, transmitting, on at least a first one of the frequency channels, a message containing information regarding traffic loading of one or more of the frequency channels, receiving, from a first one or more of the stations, a request to switch from the first frequency channel to a second frequency channel, and receiving data from the first station via the second frequency channel.

Certain aspects provide a method of wireless communications. The method generally includes communicating with an apparatus via a first of a plurality of frequency channels, receiving, from the apparatus on the first frequency channel, a message containing information regarding traffic loading of one or more of the frequency channels, transmitting, to the apparatus, a request to switch from the first frequency channel to a second frequency channel, and transmitting data via the second frequency channel.

Certain aspects provide an apparatus for wireless communications. The apparatus generally includes a device configured to communicate with a plurality of wireless apparatuses concurrently via a plurality of frequency channels, and a transmitter configured to transmit a request for at least one of the wireless apparatuses to switch from communicating via a first one of the frequency channels to communicating via a second one of the frequency channels.

Certain aspects provide an apparatus for wireless communications. The apparatus generally includes a device configured to communicate with an apparatus via a first of a plurality of frequency channels, a receiver configured to receive a request, from the access point, to switch from the first to a second of the plurality of frequency channels, and a device configured to communicate with the access point via the second frequency channel.

Certain aspects provide an apparatus for wireless communications. The apparatus generally includes a device configured to communicate with a plurality of wireless apparatuses concurrently via a plurality of frequency channels, a transmitter configured to transmit, on at least a first one of the frequency channels, a message containing information regarding traffic loading of one or more of the frequency channels, a receiver configured to receive, from a first one or more of the wireless apparatuses, a request to switch from the first frequency channel to a second frequency channel, and a receiver configured to receive data from the first wireless apparatus via the second frequency channel.

Certain aspects provide an apparatus for wireless communications. The apparatus generally includes a device configured to communicate with another apparatus via a first of a plurality of frequency channels, a receiver configured to receive, from the other apparatus on the first frequency channel, a message containing information regarding traffic loading of one or more of the frequency channels, a transmitter configured to transmit, to the other apparatus, a request to switch from the first frequency channel to a second frequency channel, and a transmitter configured to transmit data via the second frequency channel.

Certain aspects provide an apparatus for wireless communications. The apparatus generally includes means for communicating with a plurality of wireless apparatuses concurrently via a plurality of frequency channels and means for transmitting a request for at least one of the wireless apparatuses to switch from communicating via a first one of the frequency channels to communicating via a second one of the frequency channels.

Certain aspects provide an apparatus for wireless communications. The apparatus generally includes means for communicating with another apparatus via a first of a plurality of frequency channels, means for receiving a request, from the other apparatus, to switch from the first to a second of the plurality of frequency channels, and means for communicating with the access point via the second frequency channel.

Certain aspects provide an apparatus for wireless communications. The apparatus generally includes means for communicating with a plurality of wireless apparatuses concurrently via a plurality of frequency channels, means for transmitting, on at least a first one of the frequency channels, a message containing information regarding traffic loading of one or more of the frequency channels, means for receiving, from a first one or more of the stations, a request to switch from the first frequency channel to a second frequency channel, and means for receiving data from the first station via the second frequency channel.

Certain aspects provide an apparatus for wireless communications. The apparatus generally includes means for communicating with another apparatus via a first of a plurality of frequency channels, means for receiving, from the other apparatus on the first frequency channel, a message containing information regarding traffic loading of one or more of the frequency channels, means for transmitting, to the other apparatus, a request to switch from the first frequency channel to a second frequency channel, and means for transmitting data via the second frequency channel.

Certain aspects provide a computer-program product for wireless communications. The computer-program product includes a computer-readable medium encoded with instructions executable to communicate with a plurality of wireless apparatuses concurrently via a plurality of frequency channels, and transmit a request for at least one of the wireless apparatuses to switch from communicating via a first one of the frequency channels to communicating via a second one of the frequency channels.

Certain aspects provide a computer-program product for wireless communications. The computer-program product includes a computer-readable medium encoded with instructions executable to communicate with an apparatus via a first of a plurality of frequency channels, receive a request, from the apparatus, to switch from the first to a second of the plurality of frequency channels, and communicate with the apparatus via the second frequency channel.

Certain aspects provide a computer-program product for wireless communications. The computer-program product includes a computer-readable medium encoded with instructions executable to communicate with a plurality of wireless apparatuses concurrently via a plurality of frequency channels, transmit, on at least a first one of the frequency channels, a message containing information regarding traffic loading of one or more of the frequency channels, receive, from a first one or more of the wireless apparatuses, a request to switch from the first frequency channel to a second frequency channel, and receive data from the first wireless apparatus via the second frequency channel.

Certain aspects provide a computer-program product for wireless communications. The computer-program product includes a computer-readable medium encoded with instructions executable to communicate with an apparatus via a first of a plurality of frequency channels, receive, from the apparatus on the first frequency channel, a message containing information regarding traffic loading of one or more of the frequency channels, transmit, to the apparatus, a request to switch from the first frequency channel to a second frequency channel, and transmit data via the second frequency channel.

Certain aspects provide a wireless node. The wireless node generally includes at least one antenna, a device configured to communicate, via the at least one antenna, with a plurality of wireless apparatuses concurrently via a plurality of frequency channels, and a transmitter configured to transmit via the at least one antenna a request for at least one of the wireless apparatuses to switch from communicating via a first one of the frequency channels to communicating via a second one of the frequency channels.

Certain aspects provide a wireless node. The wireless node generally includes at least one antenna, a device configured to communicate with an apparatus via a first of a plurality of frequency channels, a receiver configured to receive via the at least one antenna a request, from the apparatus, to switch from the first to a second of the plurality of frequency channels, and a device configured to communicate with the access point via the second frequency channel.

Certain aspects provide a wireless node. The wireless node generally includes at least one antenna, a device configured to communicate with a plurality of wireless apparatuses concurrently via a plurality of frequency channels, a transmitter configured to transmit via the at least one antenna, on at least a first one of the frequency channels, a message containing information regarding traffic loading of one or more of the frequency channels, a receiver configured to receive via the at least one antenna, from a first one or more of the wireless apparatuses, a request to switch from the first frequency channel to a second frequency channel, and a receiver configured to receive data from the first wireless apparatus via the second frequency channel.

Certain aspects provide a wireless node. The wireless node generally includes at least one antenna, a device configured to communicate with an apparatus via a first of a plurality of frequency channels, a receiver configured to receive via the at least one antenna, from the wireless node on the first frequency channel, a message containing information regarding traffic loading of one or more of the frequency channels, a transmitter configured to transmit via the at least one antenna, to the wireless node, a request to switch from the first frequency channel to a second frequency channel, and a transmitter configured to transmit data via the second frequency channel.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 13A and 13B illustrate example performance results, in accordance with certain aspects of the present disclosure.

FIGS. 15A and 15B illustrate example performance results, in accordance with certain aspects of the present disclosure.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

AN EXAMPLE MIMO SYSTEM

Figure 1:
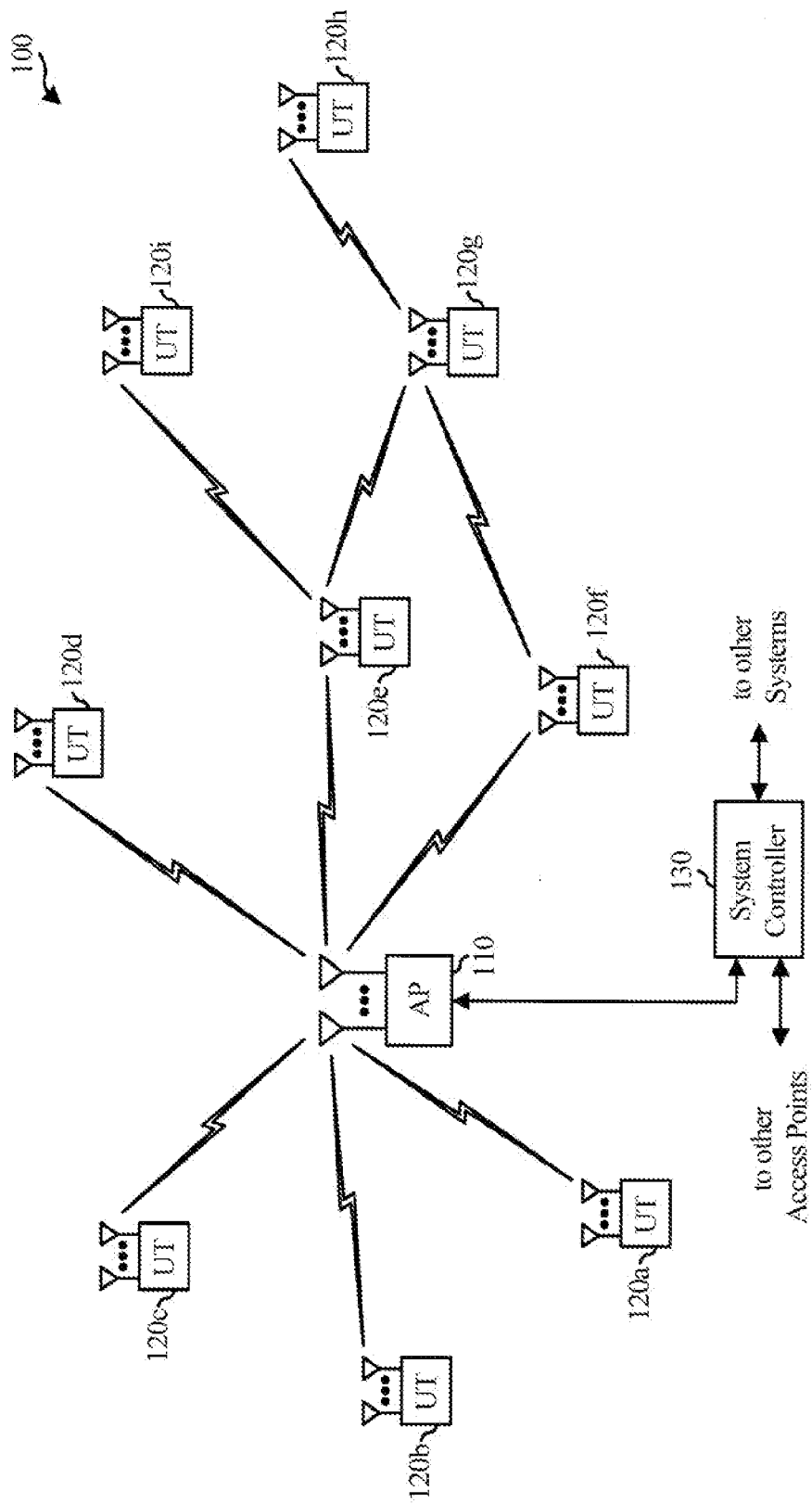
FIG. 1 illustrates a spatial division multiple access MIMO wireless system in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

As used herein, the term wireless node may generally refer to an access point, user terminal, or any type of wireless device capable of performing operations described herein.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
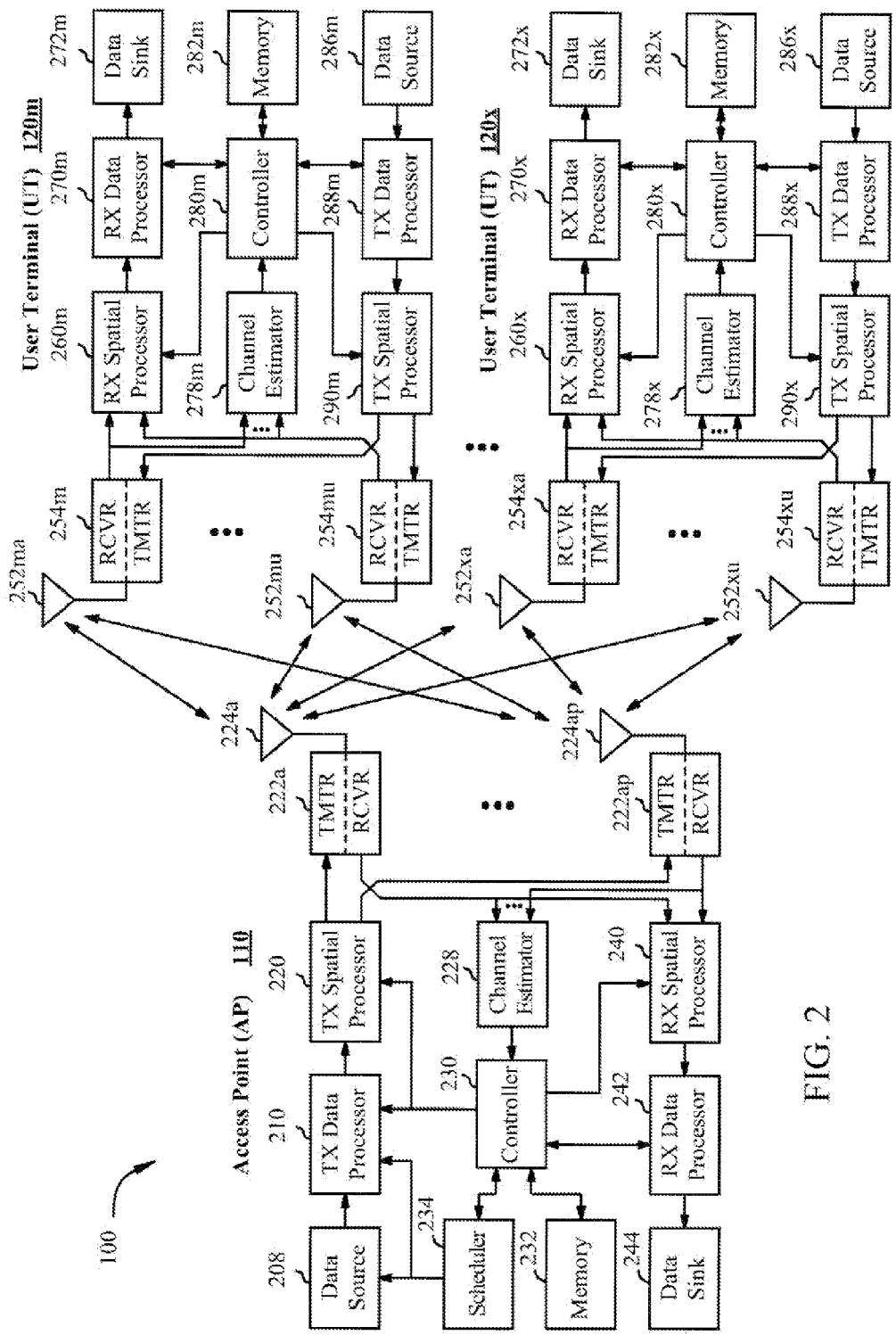
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC) or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

Figure 3:
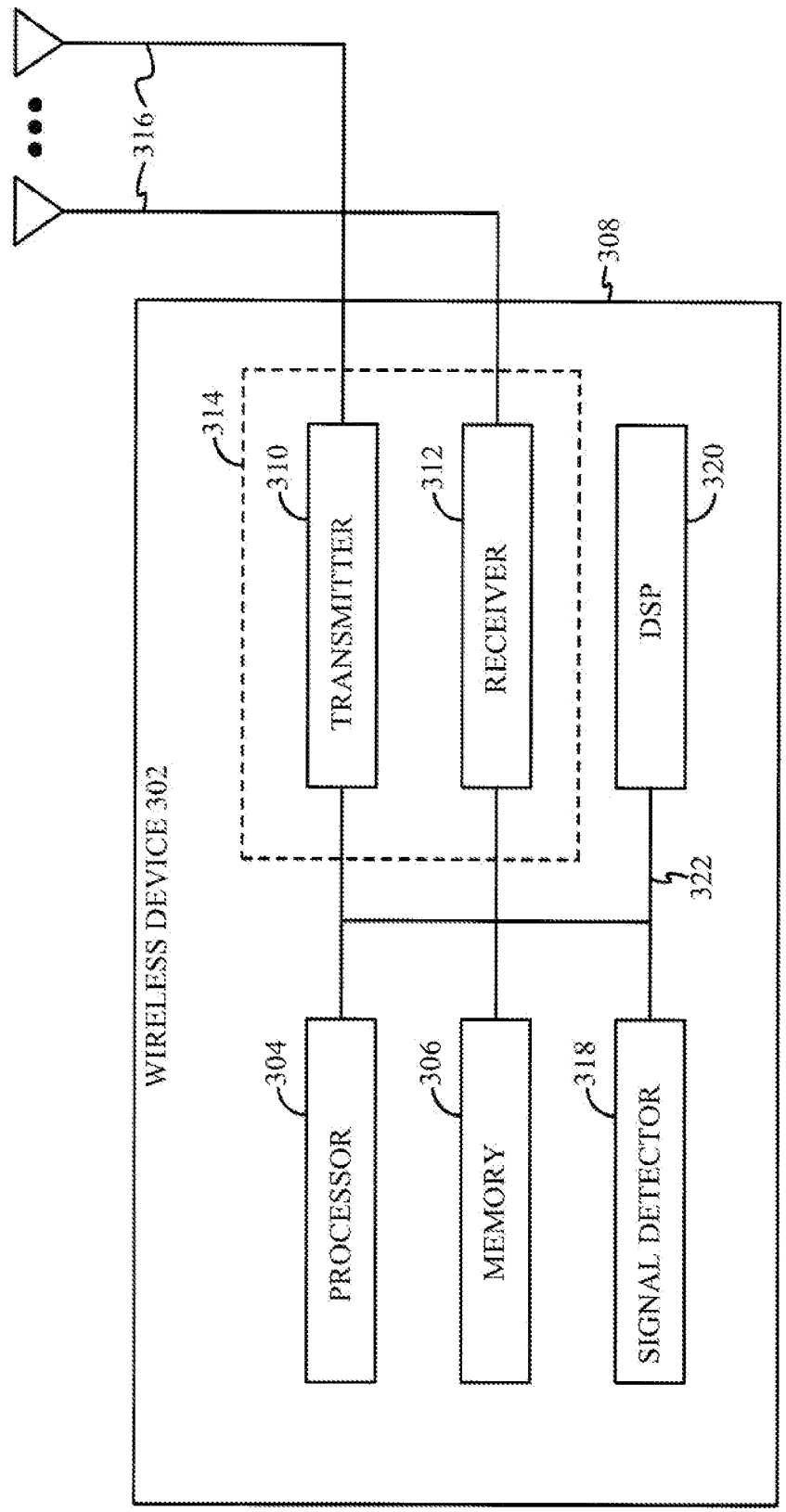
FIG. 3 illustrates example components of a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

MULTI-CHANNEL MANAGEMENT AND LOAD BALANCING

According to certain aspects, in a system utilizing multiple wireless communications channels for exchanging data between an access point (AP) and multiple stations (STAs), techniques are provided for allocating stations to transmit on different channels. The techniques presented herein include, for example, an "AP managed" scheme, in which the AP can decide where (on what channels) to allocate the STAs for downlink transmissions. The techniques presented herein also include, for example, a "STA managed" switching scheme, in which STAs can autonomously switch across different channels to send uplink data to an AP. Various algorithms are provided that may be applied to the case of "STA managed" techniques. Such algorithms allow for load balancing across channels As used herein, the phrase "simultaneous and asynchronous communication capability" generally refers to the capability of the AP to transmit data on one or more channels, while also asynchronously receiving data on a disjoint set of channels. Access terminals (ATs) or stations (STAs), on the other hand, may be restricted, such that they are not capable of simultaneously receiving data on any channel while transmitting data on one or more channels.

Figure 4:
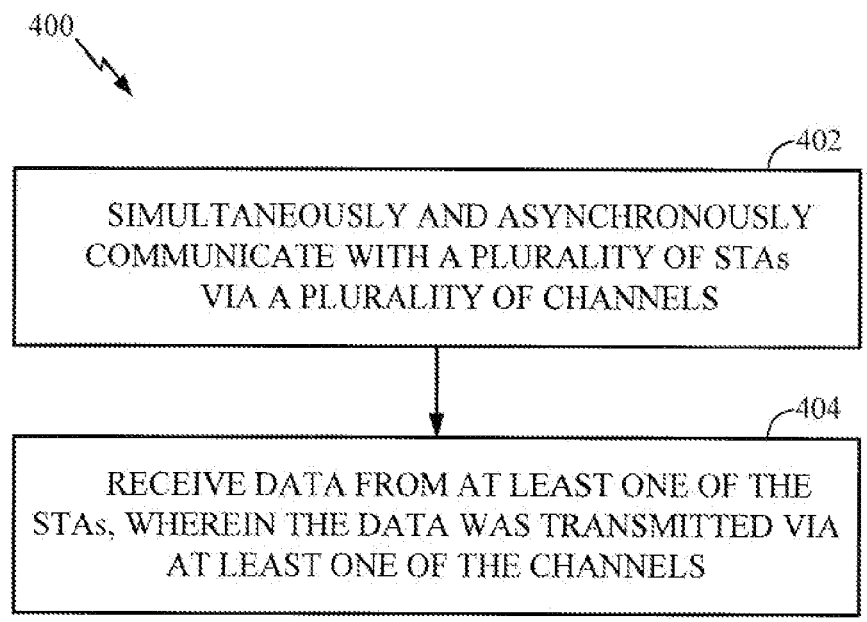
FIG. 4 illustrates example operations, in accordance with certain aspects of the present disclosure.
Figure 4A:
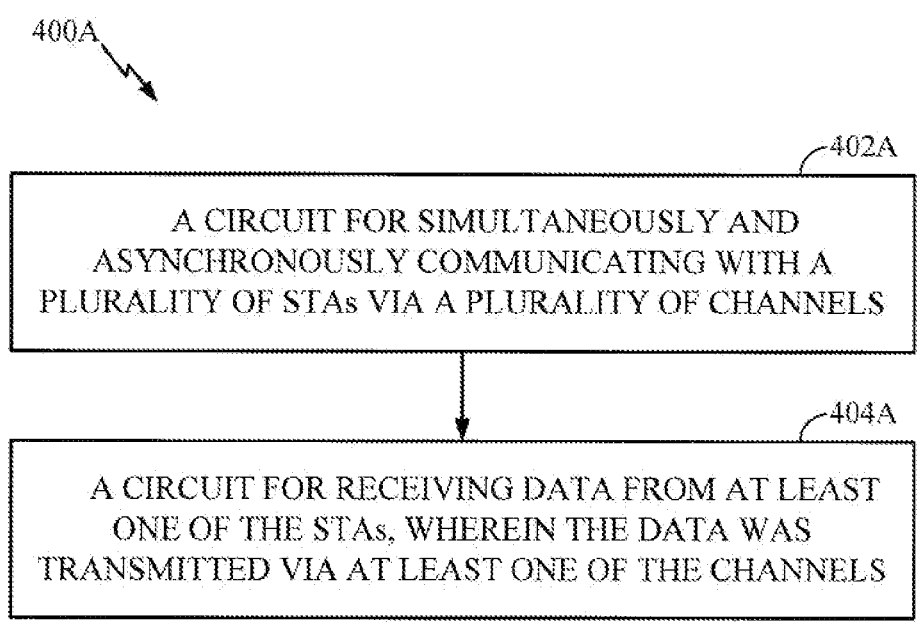
FIG. 4A illustrates example components capable of performing the operations shown in FIG. 4.

FIG. 4 illustrates example operations 400, in accordance with certain aspects of the present disclosure. The operations 400 may be performed, for example, by an AP capable of simultaneous and asynchronous communication in a multi-channel wireless communications system.

The operations begin, at 402, by simultaneously and asynchronously communicating with a plurality of STAs via a plurality of channels and, at 404, receiving data from at least one of the STAs, wherein the data was transmitted via at least one of the channels.

Figure 5:
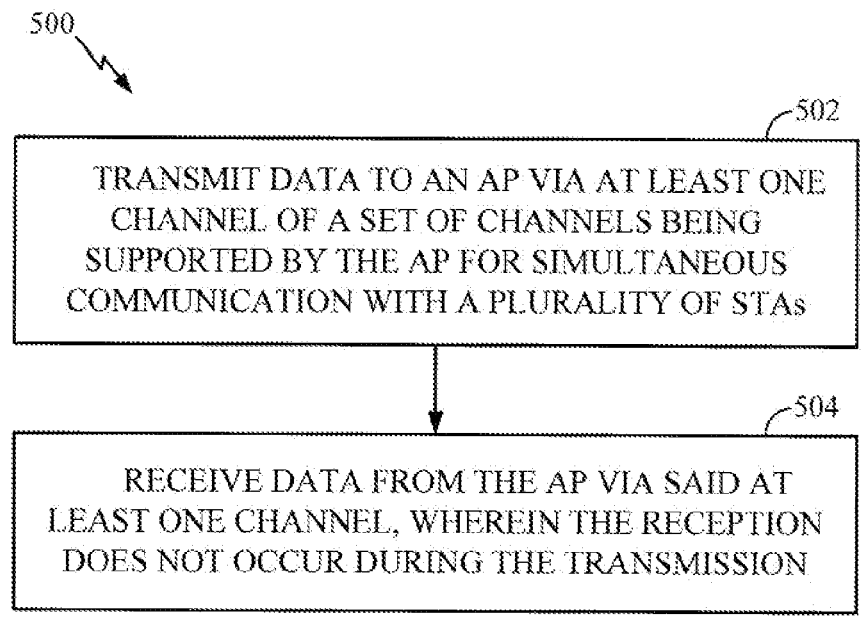
FIG. 5 illustrates example operations, in accordance with certain aspects of the present disclosure.
Figure 5A:
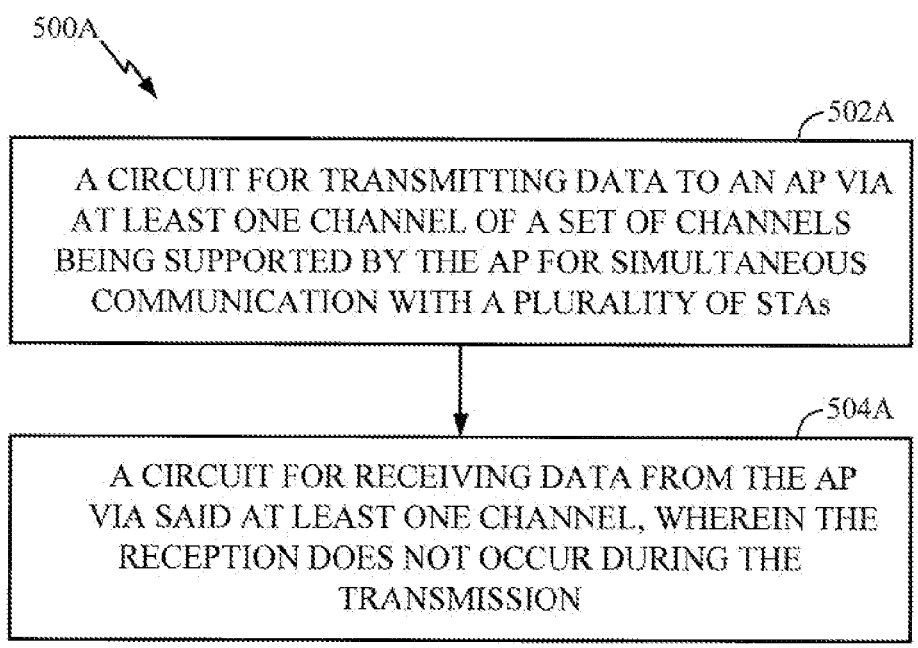
FIG. 5A illustrates example components capable of performing the operations shown in FIG. 5.

FIG. 5 illustrates example operations, in accordance with certain aspects of the present disclosure. The operations 500 may be performed, for example, by a STA in a multi-channel wireless communications system, communicating with an AP performing the operations 400 shown in FIG. 4.

The operations 500 begin, at 502, by transmitting data to an AP via at least one channel of a set of channels being supported by the AP for simultaneous communication via a plurality of STAs. At 504, the STA receives data from the AP via said at least one channel, wherein the reception does not occur during the transmission.

Figure 6:
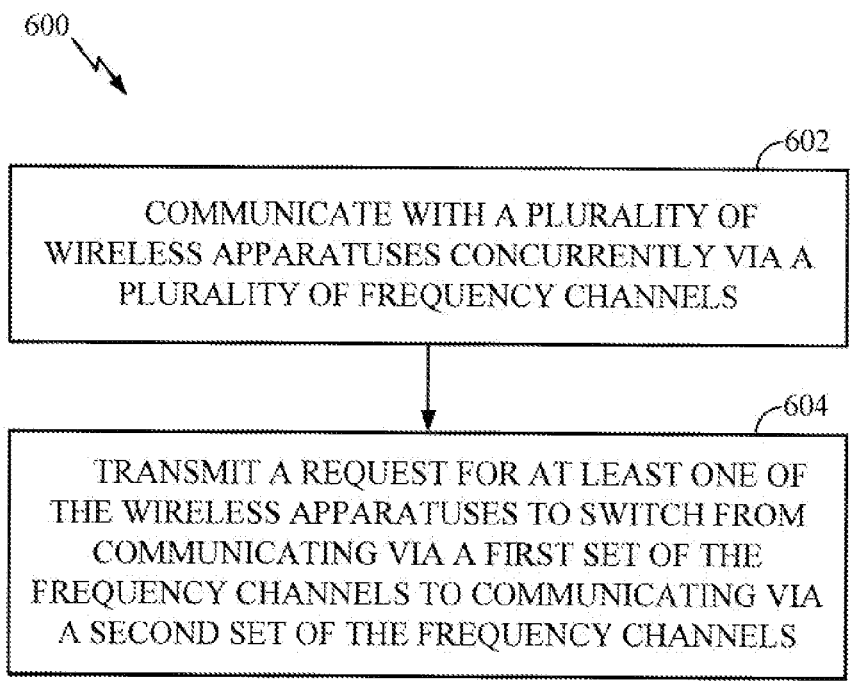
FIG. 6 illustrates example operations, in accordance with certain aspects of the present disclosure.
Figure 6A:
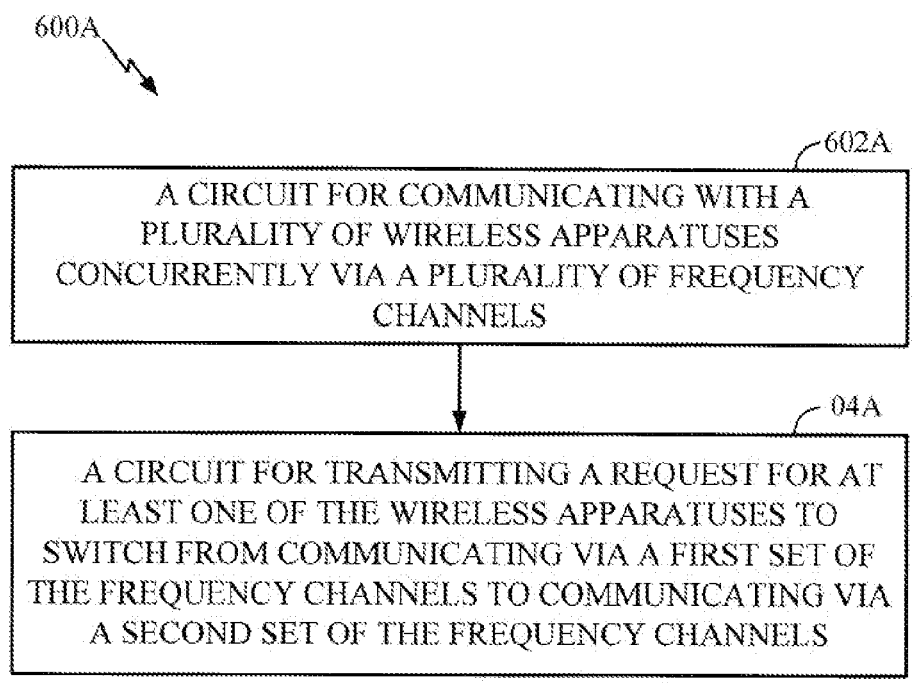
FIG. 6A illustrates example components capable of performing the operations shown in FIG. 6.

FIG. 6 illustrates example operations 600, in accordance with certain aspects of the present disclosure. The operations 600 may be performed, for example, by an AP in an "AP managed' allocation scheme in an effort to balance the transmission load between the AP and a set of STAs on a plurality of channels.

The operations begin, at 602, by communicating with a plurality of stations via a plurality of frequency channels. At 604, the AP transmits a request for at least one of the stations to switch from communicating via a first one of the frequency channels to communicating via a second one of the frequency channels. The AP may decide which stations to request to switch and to which channels based on a number of factors, such as class (switching speed), traffic for a given station, and/or load on the channels. The AP may maintain such statistics to assist in switching decisions.

Figure 7:
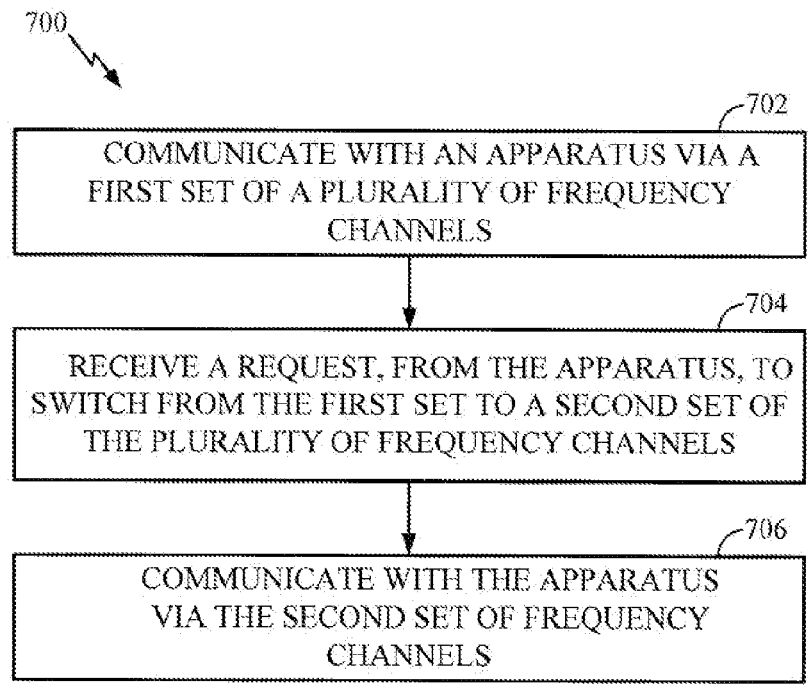
FIG. 7 illustrates example operations, in accordance with certain aspects of the present disclosure.
Figure 7A:
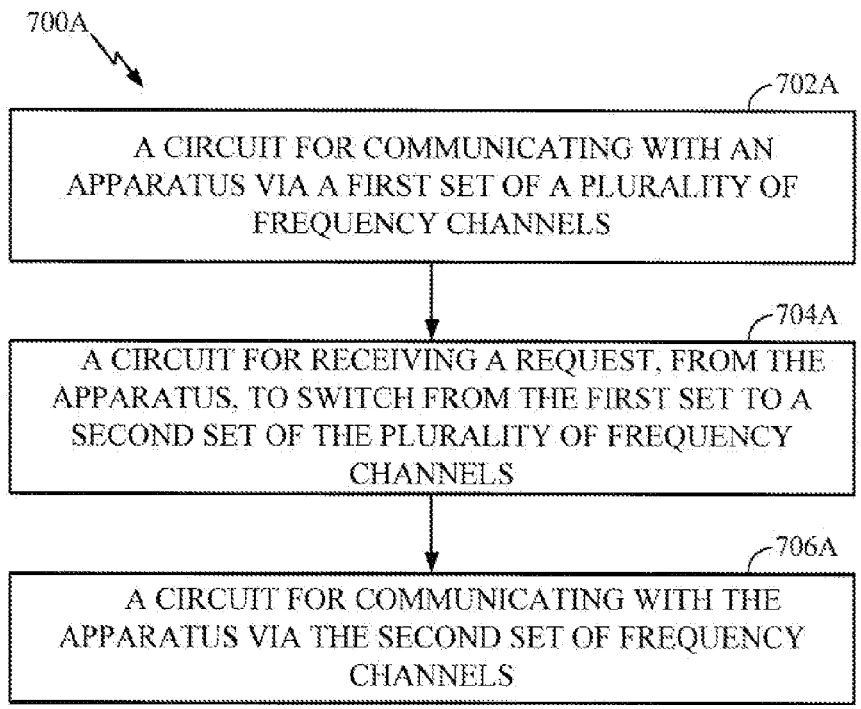
FIG. 7A illustrates example components capable of performing the operations shown in FIG. 7.

FIG. 7 illustrates example operations 700, in accordance with certain aspects of the present disclosure. The operations 700 may be performed, for example, by a STA in a multi-channel wireless communications system, communicating with an AP performing the operations 600 shown in FIG. 6.

The operations 700 begin, at 702, by communicating with an AP via a first of a plurality of frequency channels. At 704, the STA receives a request from the AP to switch from the first frequency channel to a second frequency channel of the plurality of frequency channels. At 706, the STA communicates with the AP via the second frequency channel.

Figure 8:
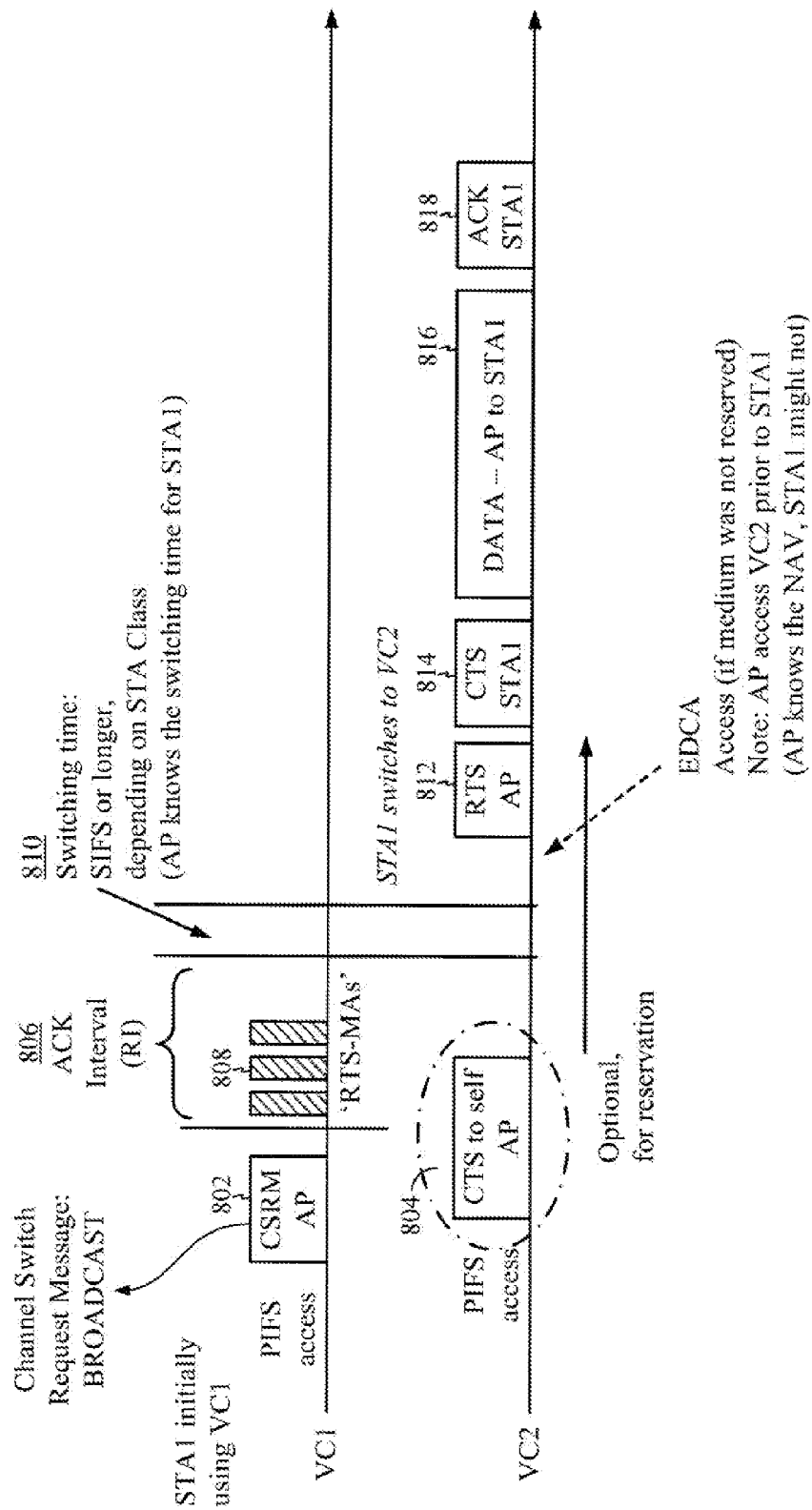
FIG. 8 illustrates example transmissions between an access point and multiple stations, in accordance with certain aspects of the present disclosure.

FIG. 8 illustrates example transmissions between an access point and multiple stations in an AP managed allocation scheme, in accordance with certain aspects of the present disclosure. The illustrated example assumes a first station (STA1) is communicating with the AP initially using a first frequency channel (virtual channel VC1). The AP sends a channel switch request message (CSRM) 802 requesting STA1 switch to a second frequency channel VC2. According to certain aspects, the AP may also transmit a clear-to-send to Self (CTS-to self) message 804 on VC2, in order to reserve VC2 and help facilitate the channel switch. This is possible, since the AP may know the appropriate Network Allocation Vector (NAV) setting, while the STA may not. If VC2 is reserved, then the AP may directly access the medium, otherwise, the AP may have to perform an EDCA access.

According the certain aspects, the CSRM 802 may be a broadcast message, identifying multiple stations and to which channels they should switch, thus allowing multiple STAs to be switched at the same time. Each of the STAs (e.g., station STA1) receiving the CSRM may acknowledge the CSRM with corresponding request to send multiple access (RTS-MA) messages 808 during an ACK interval 806.

Once on the new channel, the stations may wait for a transmission from the AP, such as an RTS 812. STA1 may respond with a CTS 814, after which the AP may send a data transmission 816 to STA1. STA1 may acknowledge receipt of the data transmission 816 with an ACK 818.

Figure 9:
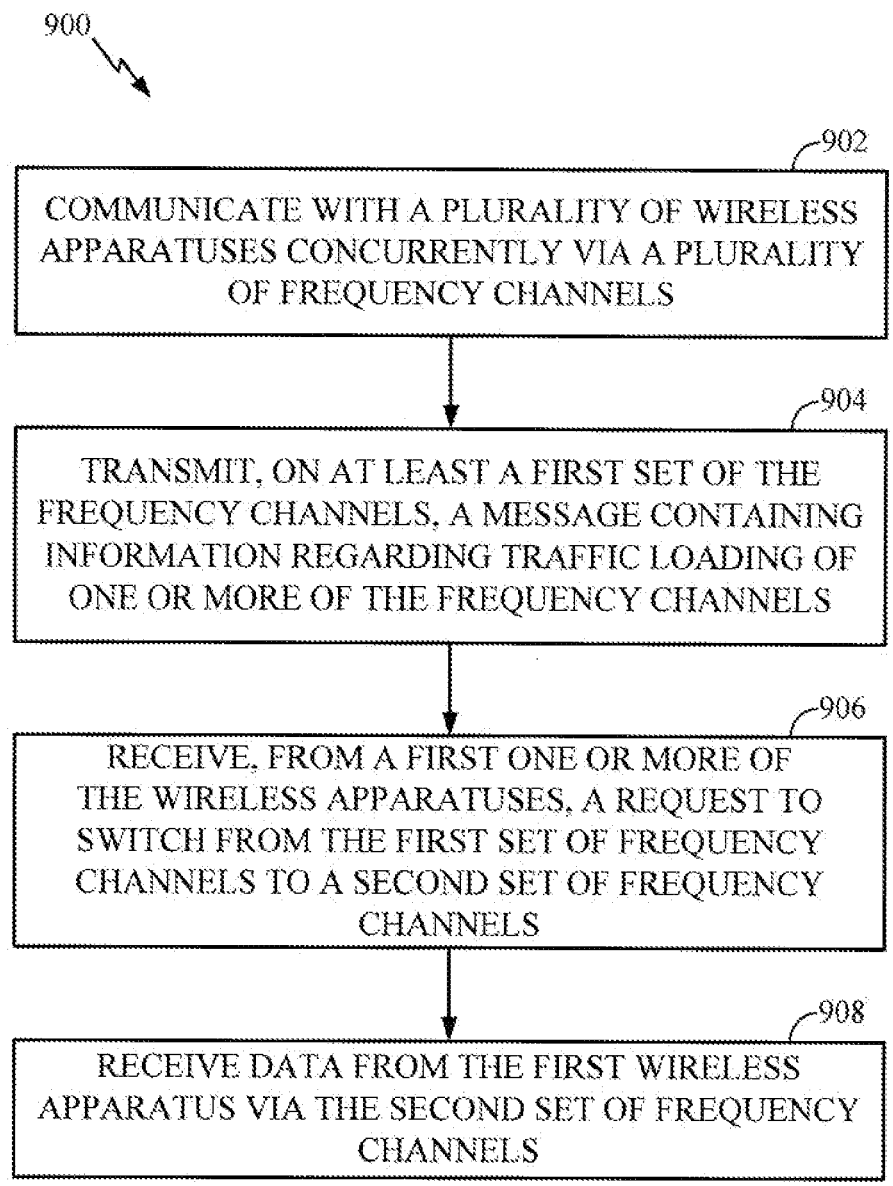
FIG. 9 illustrates example operations, in accordance with certain aspects of the present disclosure.
Figure 9A:
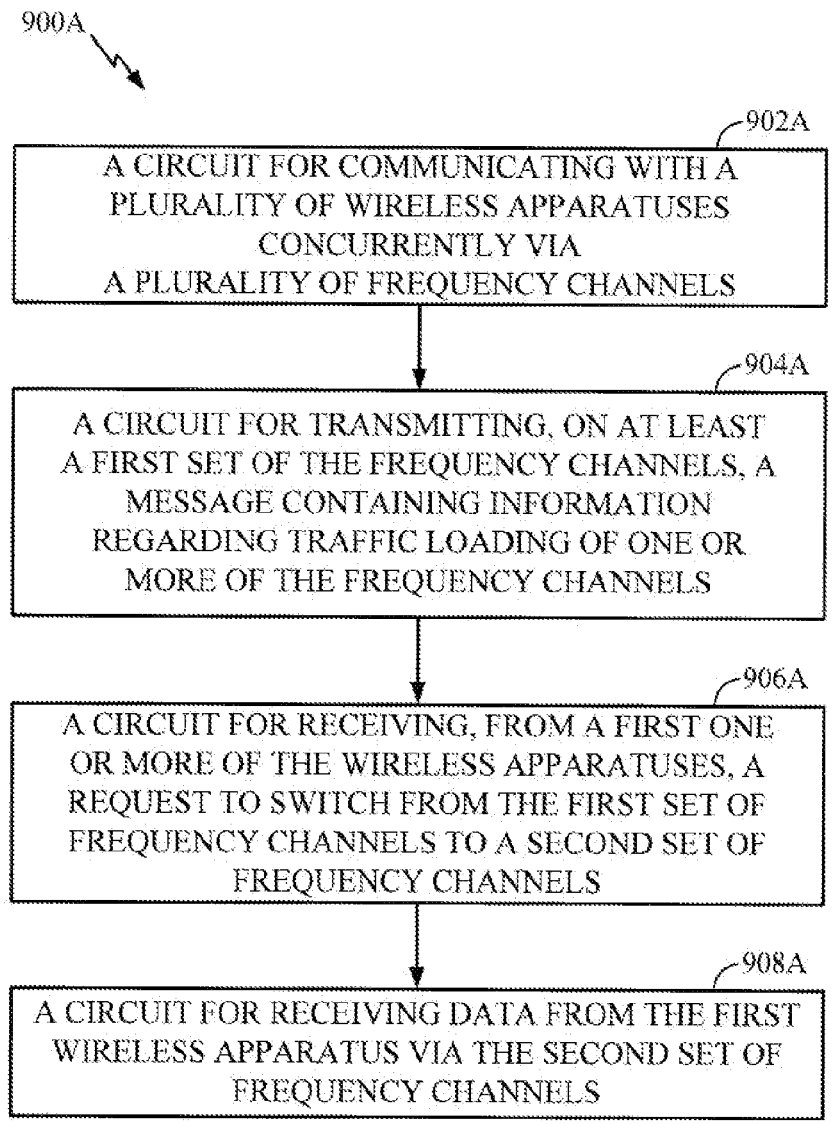
FIG. 9A illustrates example components capable of performing the operations shown in FIG. 9.

FIG. 9 illustrates example operations 900, in accordance with certain aspects of the present disclosure. The operations 900 may be performed, for example, by an AP in a "STA managed' switching scheme in an effort to balance the transmission load between the AP and a set of STAs on a plurality of channels.

The operations 900 begin, at 902, by communicating with a plurality of stations via a plurality of frequency channels. At 904, the AP transmits, on at least one of the frequency channels, a message containing information regarding traffic loading of one or more of the frequency channels. At 906, the AP receives, from a first one or more of the stations, a request to switch from the first frequency channel to a second frequency channel. At 908, the AP receives data from the first station via the second frequency channel.

Figure 10:
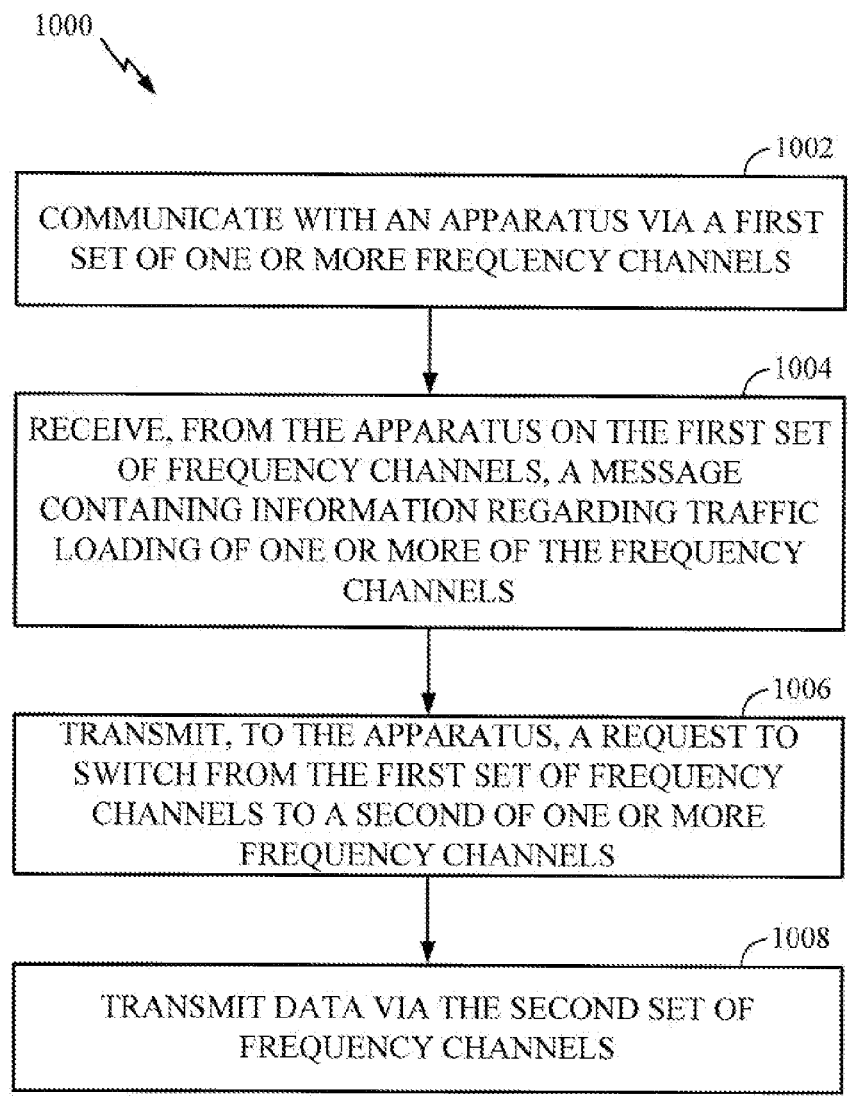
FIG. 10 illustrates example operations, in accordance with certain aspects of the present disclosure.
Figure 10A:
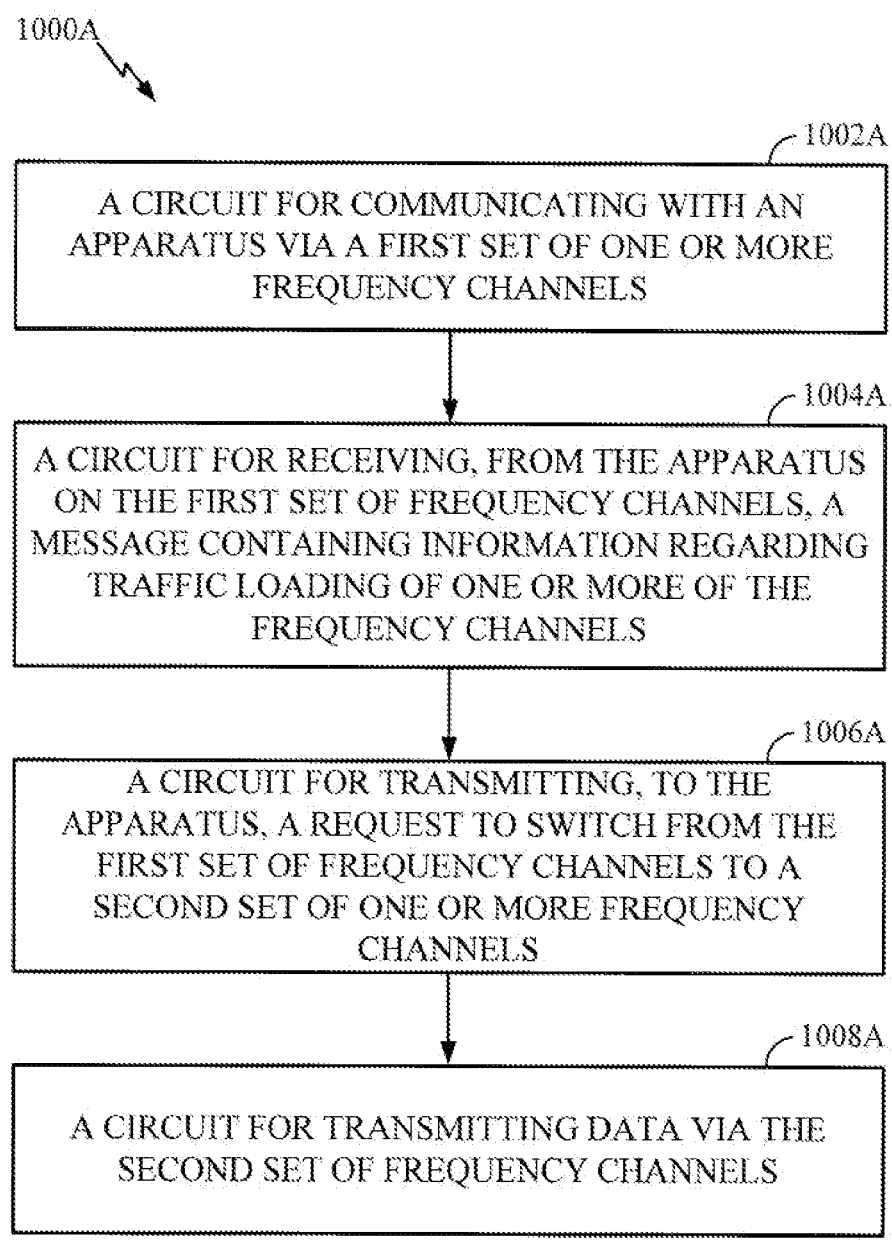
FIG. 10A illustrates example components capable of performing the operations shown in FIG. 10.

FIG. 10 illustrates example operations 1000, in accordance with certain aspects of the present disclosure. The operations 1000 may be performed, for example, by a STA in a multi-channel wireless communications system, communicating with an AP performing the operations 900 shown in FIG. 9.

The operations 1000 begin, at 1002, by communicating with an AP via a first of a plurality of frequency channels. At 1004, the STA receives, from the AP on the first frequency channel, a message containing information regarding traffic loading of one or more of the frequency channels. At 1006, the STA may transmit, to the AP, a request to switch from the first frequency channel to a second frequency channel. At 1008, the STA transmits data to the AP via the second frequency channel.

The message containing information regarding traffic loading of one or more of the frequency channels may be any suitable message format and may contain various information regarding traffic loading, such as a loading parameter, available bandwidth, number of stations on a particular channel, and the like. An STA receiving this information may, thus, make an intelligent decision regarding which channel to switch to based on this information. For example, a STA may examine the information and learn that it is currently communicating on a frequency channel that is much more heavily loaded than one or more other frequency channels. Thus, the STA may send a request to switch to one of the less loaded other frequency channels.

Figure 11:
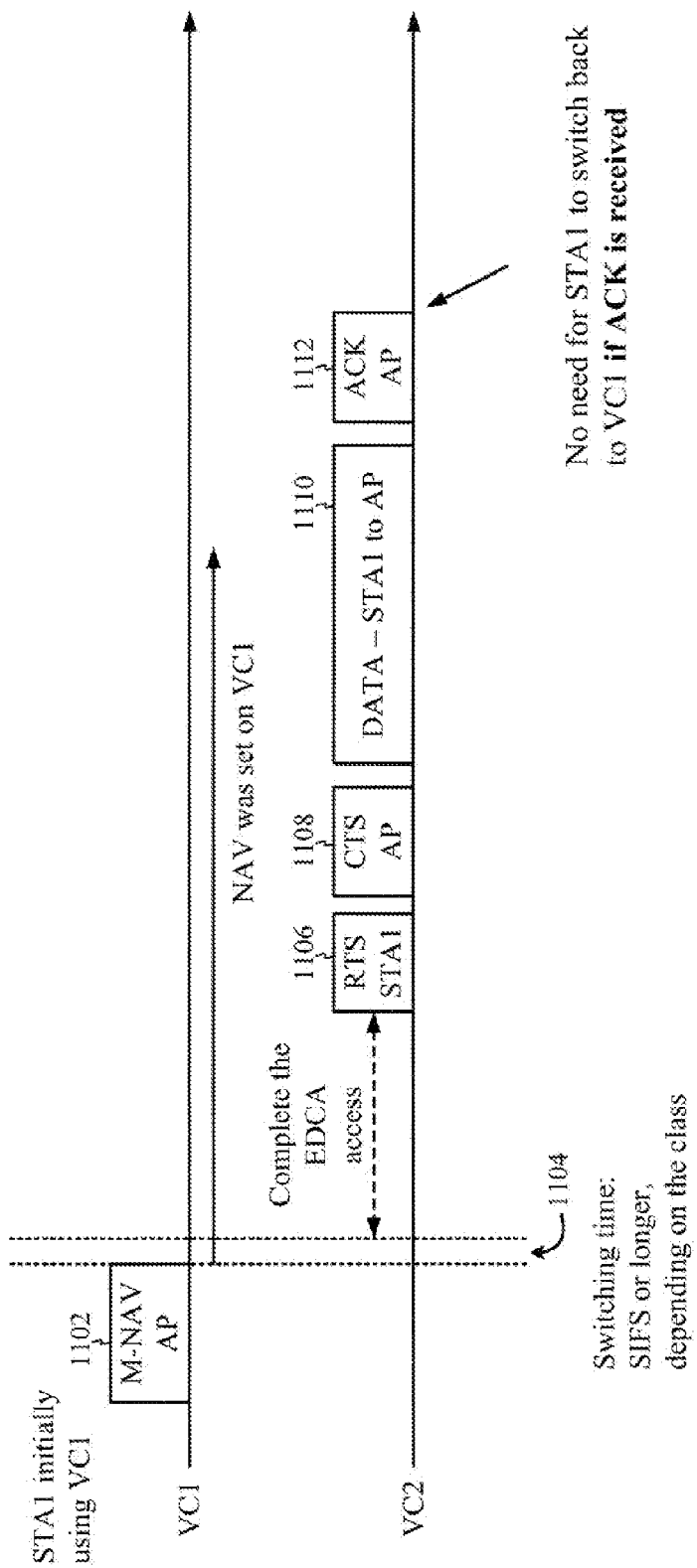
FIG. 11 illustrates example transmissions between an access point and multiple stations, in accordance with certain aspects of the present disclosure.

FIG. 11 illustrates example transmissions between an access point and multiple stations in a STA managed switching scheme, in accordance with certain aspects of the present disclosure. Again, the illustrated example assumes STA1 is communicating with the AP initially using a first frequency channel (virtual channel) VC1.

In this example, the AP sends an M-NAV message 1102, which may contain information about other channels, such as the current loading or traffic conditions. The STA may decide, based on the information about the other channels, that it would be beneficial to switch to VC2. As will be described in greater detail below, different criteria may be considered and different algorithms may be designed to decide to which channel to switch.

The AP may apply some type of algorithm to determine when and/or where (on what channels) to transmit the M-NAV, and may consider parameters, such as class (switching speed), traffic and/or load. According to certain aspects, the AP may send the M-NAV periodically and/or may send the M-NAV on multiple channels.

In order to switch to VC2, the STA may send a request message to the AP, for example, in the form of an RTS 1106 sent on VC2. The AP may respond with a CTS 1108, after which the STA may send an uplink data transmission 1110 to the AP. The AP may acknowledge receipt of the data transmission 1110 with an ACK 1112.

According to certain aspects, if STA1 does not receive the CTS 1108 and/or does not receive the ACK 1112 from the AP, STA1 may switch back to VC1 or to another channel. Thus, the STA managed scheme may help avoid channel ambiguities between the AP and STA.

Figure 12A:
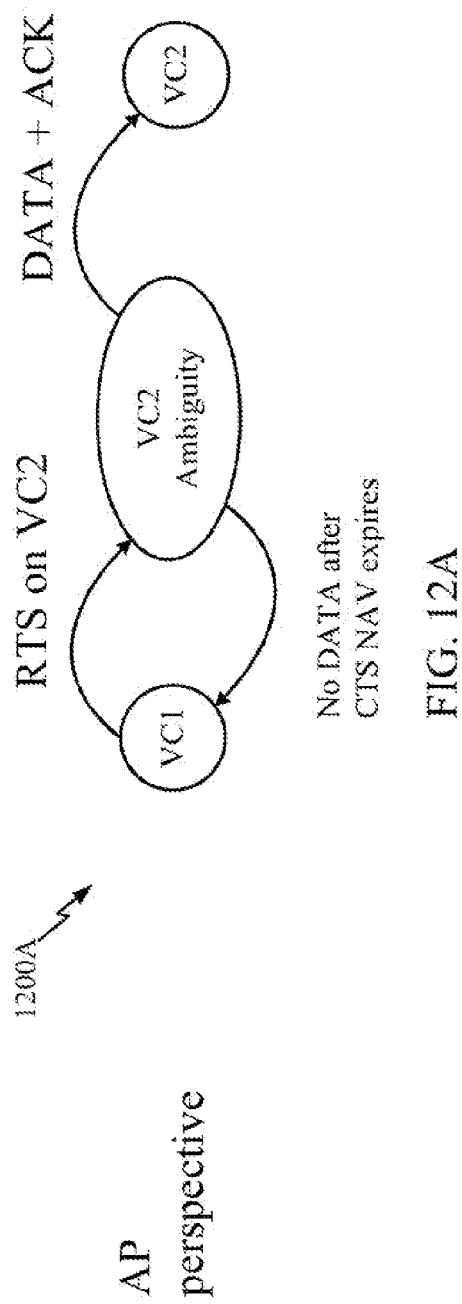
FIGS. 12A and 12B illustrate example state diagrams, in accordance with certain aspects of the present disclosure.
Figure 12B:
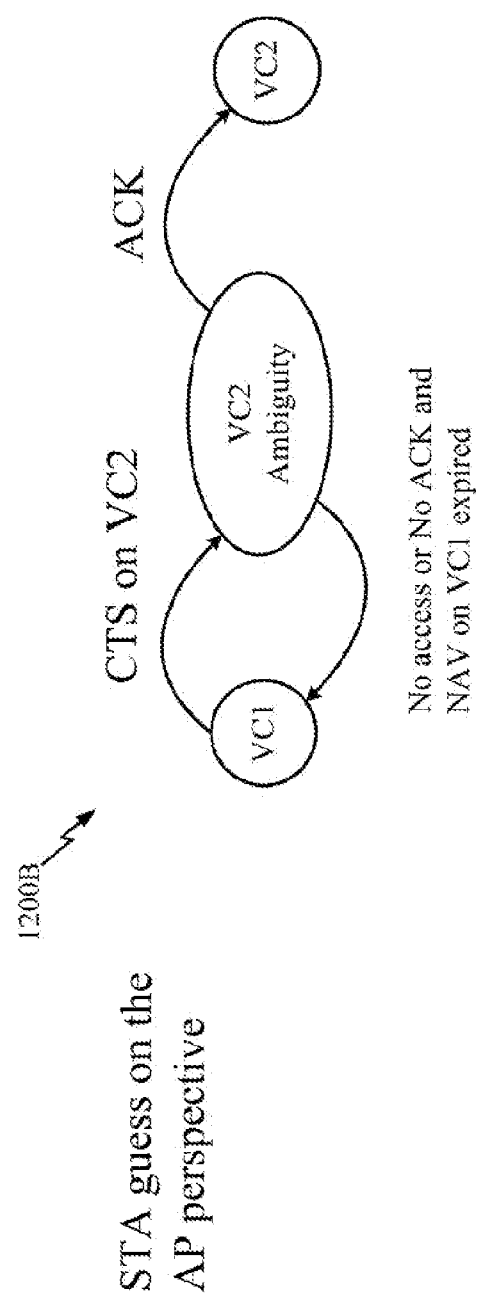

FIGS. 12A and 12B illustrate example state diagrams from the AP perspective and, the STA's guess on the AP perspective. The states represent the STA1 channel location kept at the AP.

As illustrated in the state diagram 1200A of FIG. 12A, from the AP perspective, after the STA sends the RTS on VC2, there may be some ambiguity as to whether the STA has successfully switched to VC2. If the STA sends data and the AP sends an ACK, the AP may update the STA1 channel location to VC2. However, if no data is received after the CTS NAV expires, the AP may consider the STA1 channel location to be VC1.

As illustrated in the state diagram 1200B of FIG. 12B, from the STA perspective, after the STA receives the CTS on VC2, there may be some ambiguity as to whether the STA has successfully switched to VC2. If the AP acknowledges data sent to the AP on VC2, the STA may assume the AP has updated its STA1 channel location to VC2. However, if no ACK is received and the NAV on VC1 has expired, the STA may assume the AP has returned/maintained the STA1 channel location to be VC1.

In the STA managed scheme, various algorithms may be used to decide whether to switch and, possibly, to which channel to switch. One such algorithm, is generally referred to herein as a "NAV aware" algorithm considers NAV expiration timer versus medium access time. Generally, the algorithm may decide there is no need to switch if the estimated medium access time involved in switching to another channel is greater than the NAV expiration time for the current channel. The algorithm may be described logically as follows:

IF (now + switching_time + backoffTimer.remaining > primary.$NAV$)

THEN

Do not switch;

ELSE

Switch to the channel with the shortest $NAV$;

END

This algorithm basically assumes that no other nodes will access the medium while the backoff timer is counting down. In other words, load on the other channels may not be accounted for. This assumption may prove too optimistic in certain cases, as access delay depends on channel load, as will be shown below, and this metric is strictly dependent on the statistic of the packet length.

Another switching algorithm is generally referred to herein as a "LOAD aware" switching algorithm. As the name implies, this algorithm considers the loading of other channels when deciding whether to switch and to what channel to switch. This algorithm may be described logically as follows:

FOR EACH CHANNEL:

IF channel == current channel

THEN $ET$ = MAX(channel.$NAV$, now) + access_delay

ELSE $ET$ =

MAX(channel.$NAV$, now + switching time * $Q$) + access_delay

END

END where ET is the estimated time of medium access for a given channel. This algorithm basically attempts to choose a channel with smaller ET. Q generally refers to a weighting factor for the switching delay. D generally refers to the time elapsed from the last switching, and Q may be defined as a decreasing function of D; Q in [0,1], for example, exp(-D/arrival_time). Thus, these factors may have the effect that if switching is not frequent, switching delay is not taken into consideration. If switching is frequent, switching delay is taken into consideration, such that frequent switching is discouraged.

The term access_delay in the logical expression above may be defined as backoffTimer.remaining*avg_busy_time*Ptx, where Ptx represents the probability that a packet transmission starts in a given time slot and may be estimated based on measurements kept at the AP. For example, the average arrival rate per STA may be computed, counting the number of packets sent by each station, and the channel location of each STA is known by the AP. By estimating the medium access delay on a channel, this algorithm may allow for load and may be relatively independence of packet length statistics. Further, with the Q and D factors, this algorithm may amortize switching time.

FIGS. 13A-B, 14A-B, and 15A-B illustrate and compare example performance results, in accordance with certain aspects of the present disclosure. Simulations results for an example configuration of 2 channels and 3 stations, with fixed packet length, increasing arrival intensity.

FIGS. 13A and 13B illustrate a static allocation, meaning no dynamic switching of a station between channels. The example assumes a static allocation with STA1 and STA3 on VC1 and STA2 on VC2. As illustrated in FIG. 13A, since the load is not balanced, as the per-Station load increases, the achievable throughput for STA1 and STA3 levels off. As illustrated in FIG. 13B, as the per-Station load increases, the average delay for STA1 and STA3 increases rapidly, while the average delay for STA2 on VC2 increases only gradually.

Figures 14A, 14B:
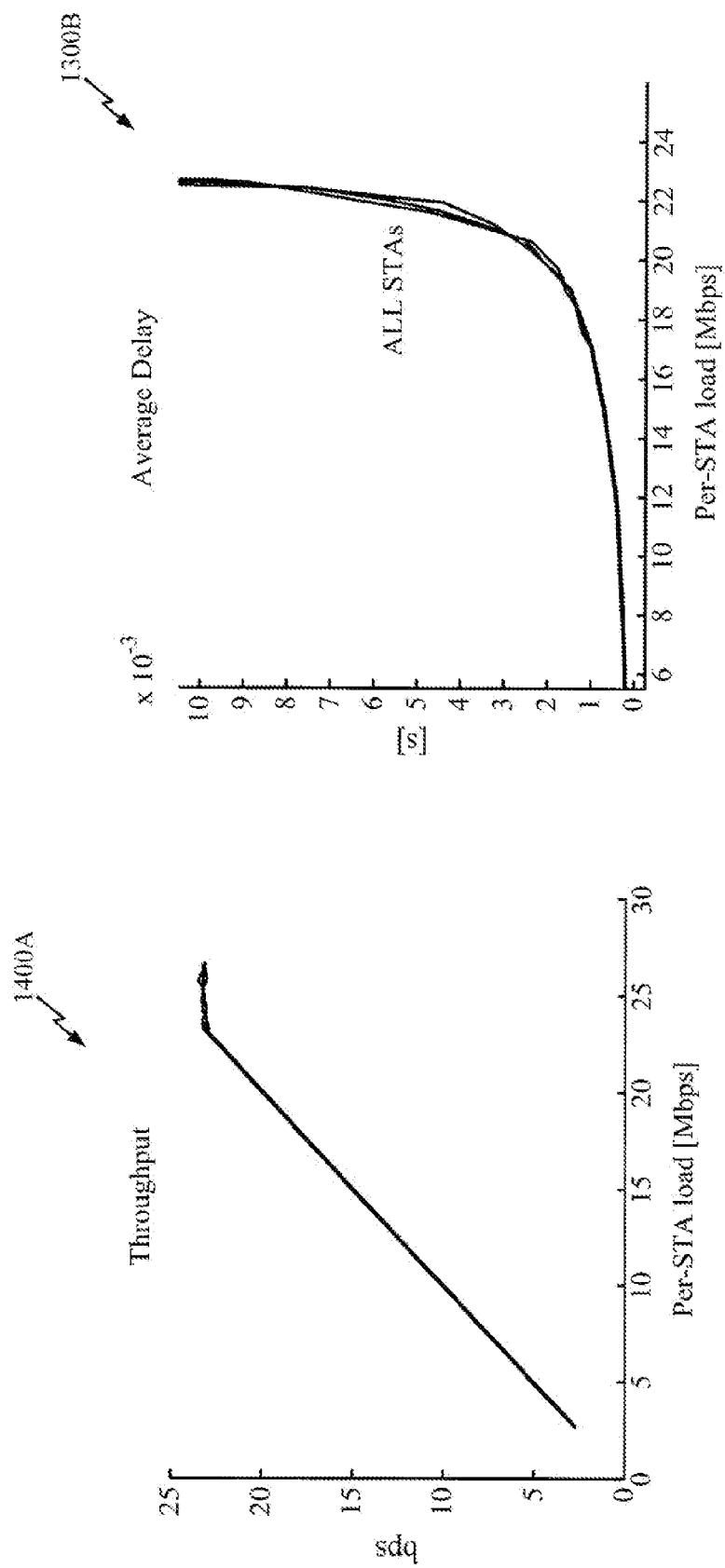
FIGS. 14A and 14B illustrate example performance results, in accordance with certain aspects of the present disclosure.

FIGS. 14A and 14B illustrate the "NAV aware" switching algorithm. As illustrated, assuming a switching time of 100 us and a maximum packet duration of 1000 us, this algorithm is able to achieve relatively efficient load balancing. As illustrated, the throughput attainable on STA1 and STA3 is increased at higher per-STA load, relative to the static switching illustrated in FIGS. 13A and 13B, while the average delay does not increase significantly until much higher per-STA loads. As switching time is increased relative to maximum packet duration, the NAV aware switching will approach the static case.

FIGS. 15A and 15B compare performance results of the NAV aware switching algorithm to the Load aware switching algorithm. As illustrated, assuming a switching time of 1000 us and a maximum packet duration of 500 us, the NAV aware algorithm suffers, while the Load aware algorithm achieves lower average delays and fewer collisions. This result may be because the Load aware algorithm allows for load balancing independently of the packet length statistic, which may help by effectively amortizing switching overhead.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, example operations 400, 500, 600, 700, 900 and 1000 illustrated in FIGS. 4, 5, 6, 7, 9 and 10, respectively, correspond to circuit blocks 400A, 500A, 600A, 700A, 900A and 1000A illustrated in FIGS. 4A, 5A, 6A, 7A, 9A and 10A, respectively.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term device may refer to hardware, software, firmware or combination thereof. According to certain aspects, a device may be implemented as a transmitter, receiver, logic to control a transmitter and/or receiver, or a combination thereof.

As used herein, a phrase referring to "at least one of" a list of items refers to any combination of those items, including single members. As an example, "at least one of: a, b, and c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, a mobile handset, a personal digital assistant (PDA) or other type of wireless devices with processing logic and elements to perform the techniques provided herein.

What is claimed is:

1. A method for wireless communications, comprising:
   communicating with a plurality of wireless apparatuses concurrently via a plurality of frequency channels;
   determining at least a first set of the plurality of frequency channels on which to transmit a message containing information regarding traffic loading and available bandwidth of one or more of the plurality of frequency channels, wherein the determination is based at least on switching speed to access a medium through a second set of the plurality of frequency channels;
   transmitting the message on the determined first set of the plurality of frequency channels;
   receiving, from a first one or more of the wireless apparatuses, based at least in part on the message, a request to switch from the first set of the plurality of frequency channels to the second set of the plurality of frequency channels; and
   receiving data from the first wireless apparatus via the second set of the plurality of frequency channels.

2. The method of claim 1, wherein the message containing information regarding traffic loading is transmitted on multiple frequency channels.

3. The method of claim 1, further comprising:
   deciding on which channel to transmit the message based further on traffic for one or more of the wireless apparatuses.

4. The method of claim 1, further comprising:
   deciding on which channel to transmit the message based further on load on one or more of the plurality of frequency channels.

5. A method for wireless communications, comprising:
   communicating with an apparatus via a first set of a plurality of frequency channels;
   receiving, from the apparatus on the first set of the plurality of frequency channels, a message containing information regarding traffic loading and available bandwidth of one or more of the plurality of frequency channels;
   determining to switch to a second set of the plurality of frequency channels based on an estimated medium access time involved in switching to the second set of the plurality of frequency channels and a Network Allocation Vector (NAV) expiration time for the first set of the plurality of frequency channels;
   transmitting, to the apparatus, based on the message and the determination, a request to switch from the first set of the plurality of frequency channels to the second set of the plurality of frequency channels; and
   transmitting data via the second set of the plurality of frequency channels.

6. An apparatus for wireless communications configured to communicate with a plurality of wireless apparatuses concurrently via a plurality of frequency channels, the apparatus comprising:
   a circuit configured to determine at least a first set of the plurality of frequency channels on which to transmit a message containing information regarding traffic loading and available bandwidth of one or more of the plurality of frequency channels, wherein the determination is based at least on switching speed to access a medium through a second set of the plurality of frequency channels;
   a transmitter configured to transmit the message on the determined first set of the plurality of frequency channels; and
   a receiver configured to:
      receive, from a first one or more of the wireless apparatuses, based at least in part on the message, a request to switch from the first set of the plurality of frequency channels to the second set of the plurality of frequency channels; and
      receive data from the first wireless apparatus via the second set of the plurality of frequency channels.

7. The apparatus of claim 6, wherein the message containing information regarding traffic loading is transmitted on multiple frequency channels.

8. The apparatus of claim 6, further comprising:
   a circuit configured to decide on which channel to transmit the message based further on traffic for one or more of the wireless apparatuses.

9. The apparatus of claim 6, further comprising:
   a circuit configured to decide on which channel to transmit the message based further on load on one or more of the plurality of frequency channels.

10. An apparatus for wireless communications configured to communicate with another apparatus via a first set of a plurality of frequency channels, the apparatus comprising:
- a receiver configured to receive, from the other apparatus on the first set of the plurality of frequency channels, a message containing information regarding traffic loading and available bandwidth of one or more of the plurality of frequency channels;
- a circuit configured to determine to switch to a second set of the plurality of frequency channels based on an estimated medium access time involved in switching to the second set of the plurality of frequency channels and a Network Allocation Vector (NAV) expiration time for the first set of the plurality of frequency channels; and
- a transmitter configured to:
  - transmit, to the other apparatus, based on the message and the determination, a request to switch from the first set of the plurality of frequency channels to the second set of the plurality of frequency channels; and
  - transmit data via the second set of the plurality of frequency channels.

11. An apparatus for wireless communications, comprising:
- means for communicating with a plurality of wireless apparatuses concurrently via a plurality of frequency channels;
- means for determining at least a first set of the plurality of frequency channels on which to transmit a message containing information regarding traffic loading and available bandwidth of one or more of the plurality of frequency channels, wherein the determination is based at least on switching speed to access a medium through a second set of the plurality of frequency channels;
- means for transmitting the message on the determined first set of the plurality of frequency channels; and
- means for receiving configured to:
  - receive, from a first one or more of the wireless apparatuses, based at least in part on the message, a request to switch from the first set of the plurality of frequency channels to the second set of the plurality of frequency channels; and
  - receive data from the first wireless apparatus via the second set of the plurality of frequency channels.

12. The apparatus of claim 11, wherein the message containing information regarding traffic loading is transmitted on multiple frequency channels.

13. The apparatus of claim 11, further comprising:
- means for deciding on which channel to transmit the message based further on traffic for one or more of the wireless apparatuses.

14. The apparatus of claim 11, further comprising:
- means for deciding on which channel to transmit the message based further on load on one or more of the plurality of frequency channels.

15. An apparatus for wireless communications, comprising:
- means for communicating with another apparatus via a first set of a plurality of frequency channels;
- means for receiving, from the other apparatus on the first set of the plurality of frequency channels, a message containing information regarding traffic loading and available bandwidth of one or more of the plurality of frequency channels;
- means for determining to switch to a second set of the plurality of frequency channels based on an estimated medium access time involved in switching to the second set of the plurality of frequency channels and a Network Allocation Vector (NAV) expiration time for the first set of the plurality of frequency channels; and
- means for transmitting configured to:
  - transmit, to the other apparatus, based on the message and the determination, a request to switch from the first set of the plurality of frequency channels to the second set of the plurality of frequency channels; and
  - transmit data via the second set of the plurality of frequency channels.

16. A computer-program product for wireless communications, comprising a computer-readable device encoded with instructions executable to:
- communicate with a plurality of wireless apparatuses concurrently via a plurality of frequency channels;
- determine at least a first set of the plurality of frequency channels on which to transmit a message containing information regarding traffic loading and available bandwidth of one or more of the plurality of frequency channels, wherein the determination is based at least on switching speed to access a medium through a second set of the plurality of frequency channels;
- transmit the message on the determined first set of the plurality of frequency channels;
- receive, from a first one or more of the wireless apparatuses, based at least in part on the message, a request to switch from the first set of the plurality of frequency channels to the second set of the plurality of frequency channels; and
- receive data from the first wireless apparatus via the second set of the plurality of frequency channels.

17. A computer-program product for wireless communications, comprising a computer-readable device encoded with instructions executable to:
- communicate with an access point via a first set of a plurality of frequency channels;
- receive, from the access point on the first set of the plurality of frequency channels, a message containing information regarding traffic loading and available bandwidth of one or more of the plurality of frequency channels;
- determine to switch to a second set of the plurality of frequency channels based on an estimated medium access time involved in switching to the second set of the plurality of frequency channels and a Network Allocation Vector (NAV) expiration time for the first set of the plurality of frequency channels;
- transmit, to the access point, based on the message and the determination, a request to switch from the first set of the plurality of frequency channels to the second set of the plurality of frequency channels;
- transmit data via the second set of the plurality of frequency channels.

18. A wireless node configured to communicate with a plurality of wireless apparatuses concurrently via a plurality of frequency comprising:
- at least one antenna;
- a circuit configured to determine at least a first set of the plurality of frequency channels on which to transmit a message containing information regarding traffic loading and available bandwidth of one or more of the plurality of frequency channels, wherein the determination is based at least on switching speed to access a medium through a second set of the plurality of frequency channels;
- a transmitter configured to transmit, via the at least one antenna, the message on the determined first set of the plurality of frequency channels; and
- a receiver configured to:

receive via the at least one antenna, from a first one or more of the wireless apparatuses, based at least in part on the message, a request to switch from the first set of the plurality of frequency channels to the second set of the plurality of frequency channels; and receive via the at least one antenna, data from the first wireless apparatus, via the second set of the plurality of frequency channels.

19. A wireless node configured to communicate with an access point via a first set of a plurality of frequency channels, comprising:

at least one antenna;

a receiver configured to receive via the at least one antenna, from the access point on the first set of the plurality of frequency channels, a message containing information regarding traffic loading and available bandwidth of one or more of the plurality of frequency channels;

a circuit configured to determine to switch to a second set of the plurality of frequency channels based on an estimated medium access time involved in switching to the second set of the plurality of frequency channels and a Network Allocation Vector (NAV) expiration time for the first set of the plurality of frequency channels; and a transmitter configured to:

transmit via the at least one antenna, to the access point, based on the message and the determination, a request to switch from the first set of the plurality of frequency channels to the second set of the plurality of frequency channels; and transmit via the at least one antenna, data via the second set of the plurality of frequency channels.

* * * * *